US009905371B2

(12) United States Patent
Kurungot et al.

(10) Patent No.: US 9,905,371 B2
(45) Date of Patent: Feb. 27, 2018

(54) ALL-SOLID-STATE-SUPERCAPACITOR AND A PROCESS FOR THE FABRICATION THEREOF

(71) Applicant: Council of Scientific & Industrial Research, New Delhi (IN)

(72) Inventors: Sreekumar Kurungot, Maharashtra (IN); Manohar Virupax Badiger, Maharashtra (IN); Bihag Anothumakkool, Maharashtra (IN); Arun Torris, Maharasthra (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 189 days.

(21) Appl. No.: 14/784,759

(22) PCT Filed: Apr. 15, 2014

(86) PCT No.: PCT/IN2014/000233
§ 371 (c)(1),
(2) Date: Oct. 15, 2015

(87) PCT Pub. No.: WO2014/170912
PCT Pub. Date: Oct. 23, 2014

(65) Prior Publication Data
US 2016/0055983 A1    Feb. 25, 2016

(30) Foreign Application Priority Data
Apr. 15, 2013 (IN) .......................... 1111/DEL/2013

(51) Int. Cl.
*H01G 11/28* (2013.01)
*H01G 11/48* (2013.01)
(Continued)

(52) U.S. Cl.
CPC ............ *H01G 11/28* (2013.01); *H01G 11/48* (2013.01); *H01G 11/56* (2013.01); *H01G 11/68* (2013.01);
(Continued)

(58) Field of Classification Search
CPC .......... H01G 4/28; H01G 11/68; H01G 11/86; H01G 11/56; H01G 11/70; H01G 11/48; H01G 11/84
See application file for complete search history.

(56) References Cited

U.S. PATENT DOCUMENTS

| 7,508,650 B1 * | 3/2009 | Bluvstein ............... H01G 11/38 29/25.03 |
| 2002/0089807 A1 | 7/2002 | Bluvstein et al. |

(Continued)

OTHER PUBLICATIONS

Meng, Fanhui, et al., "Sub-Micrometer-Thick All-Solid-State Supercapacitors with High Power and Energy Densities." *Advanced Materials*, (2011), pp. 4098-4102.
(Continued)

*Primary Examiner* — David M Sinclair
(74) *Attorney, Agent, or Firm* — Workman Nydegger

(57) ABSTRACT

The present invention discloses. all-solid-state supercapacitor (ASSP) with enhanced electrode-electrolyte interface which gives highest very high specific capacitance, areal capacitance and shows very low internal resistance (ESR). The invention particularly discloses the fabrication of all-solid-state supercapacitor by intercalation of solid state polymer electrolyte inside the conducting porous substrate coated with a charge storage electrode material to achieve the desired effect.

16 Claims, 19 Drawing Sheets

(51) Int. Cl.
 H01G 11/56 (2013.01)
 H01G 11/70 (2013.01)
 H01G 11/86 (2013.01)
 H01G 11/68 (2013.01)
 H01G 11/84 (2013.01)
(52) U.S. Cl.
 CPC ............ *H01G 11/70* (2013.01); *H01G 11/86* (2013.01); *H01G 11/84* (2013.01); *Y02E 60/13* (2013.01)

(56) References Cited

U.S. PATENT DOCUMENTS

| | | | |
|---|---|---|---|
| 2005/0153130 A1 | 7/2005 | Long et al. | |
| 2011/0045350 A1* | 2/2011 | Amos | C01G 45/02 429/219 |
| 2012/0014038 A1* | 1/2012 | Meng | H01G 11/26 361/502 |
| 2013/0083452 A1* | 4/2013 | Chiu | H01G 11/36 361/502 |
| 2013/0208404 A1* | 8/2013 | Yasuda | H01G 11/06 361/516 |
| 2014/0376158 A1* | 12/2014 | Kim | H01G 11/24 361/502 |
| 2015/0287544 A1* | 10/2015 | Irazoqui | H01G 11/36 361/502 |

OTHER PUBLICATIONS

Wu, Zhong-Shuai, et al. "Three-Dimensional Nitrogen and Boron Co-doped Graphene for High-Performance All-Solid-State Supercapacitors." *Advanced Materials*, (2012), pp. 5130-5135.

Lu, Xi-Hong, et al.: "Flexible Solid-State Supercapacitors Based on Carbon Nanoparticles/MnO2 Nanorods Hybrid Structure", *ACS Nano*, (Dec. 19, 2011), pp. 656-661.

Wu, Qiong, et al. "Supercapacitors based on flexible graphene/polyaniline nanofiber composite films." *ACS Nano*, vol. 4, No. 4 (2010), pp. 1963-1970.

Snook, Graeme, et al., "Conducting-polymer-based supercapacitor devices and electrodes." *Journal of Power Sources*, (2010), pp. 1-12.

Yuan, Longyan, et al., "Paper-Based Supercapacitors for Self-Powered Nanosystems", *Angewandte Communications*, vol. 51, (Apr. 4, 2012), pp. 4934-4938.

Meng, Chuizhou, et al., "Highly Flexible and All-Solid-State Paper-like Polymer Supercapacitors" *Nano Letters*, (2010), pp. 4025-4031.

Kaempgen, Martti, et al., "Printable Thin Film Supercapacitors Using Single-Walled Carbon Nanotubes" *Nano Letters*, vol. 9, No. 5, (2009), pp. 1872-1876.

Agrawal, R.C., et al.: "Solid Polymer Electrolytes: Materials Designing and All-Solid-State Battery Applications: an Overview", *Journal of Physics D: Applied Physics*, vol. 41, No. 22, (Oct. 29, 2008), pp. 1-18.

Song, J.Y., et al.: "Review of Gel-Type Polymer Electrolytes for Lithium-Ion Batteries", *Journal of Power Sources*, vol. 77, (Feb. 1999), pp. 183-197.

Wright, Peter, et al.: "Polymer Electrolytes—the Early Days", *Electrochimica Acta*, vol. 43, No. 10-11, (1998) pp. 1137-1143.

Zhang, Yong, et al. "Progress of electrochemical capacitor electrode materials: A review." *International journal of hydrogen energy*, (2009), pp. 4889-4899.

Wang, Xianfu, et al., "Three-Dimensional Hierarchical GeSe2 Nanostructrues for High Performance Flexible All-Solid-State Supercapacitors" *Advanced Materials*, (2013), pp. 1479-1486.

Simon, Patrice, et al.: "Materials for Electrochemical Capacitors", *Nature Materials*, (Nov. 2008), pp. 845-854.

Yang, Zhenguo, et al.: "Electrochemical Energy Storage for Green Grid", *Chemical Reviews*, (Mar. 4, 2011), pp. 3577-3613.

Winter, Martin, et al: "What are Batteries, Fuel Cells, and Supercapacitors?", *Chemical Reviews*, vol. 7, (2004), pp. 4245-4269.

PCT/IN2014/000233, Oct. 7, 2014, International Search Report and Written Opinion.

PCT/IN2014/000233, Jul. 27, 2015, International Preliminary Report on Patentability.

* cited by examiner

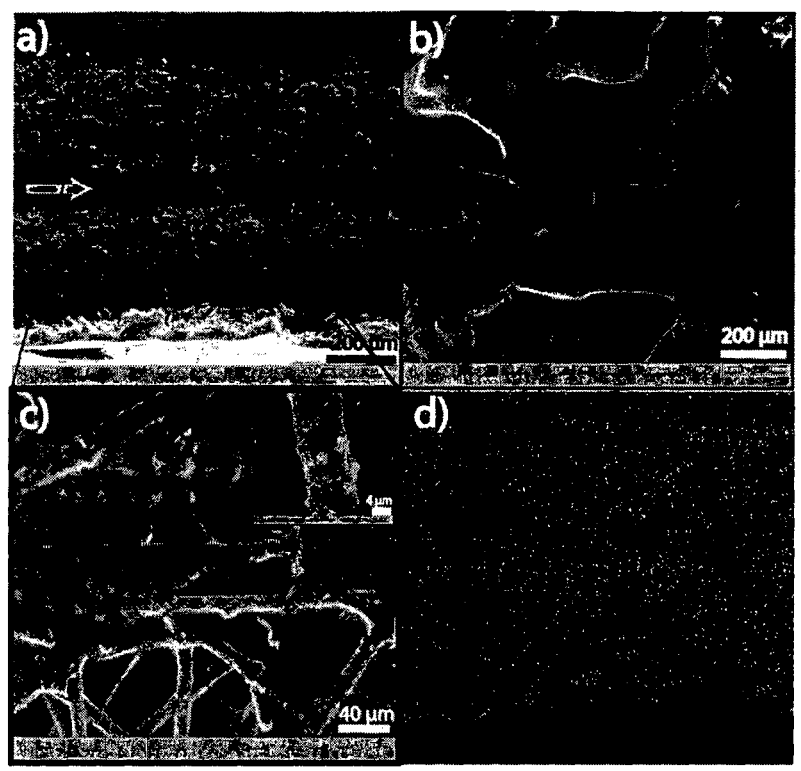
Figure 6 (II)

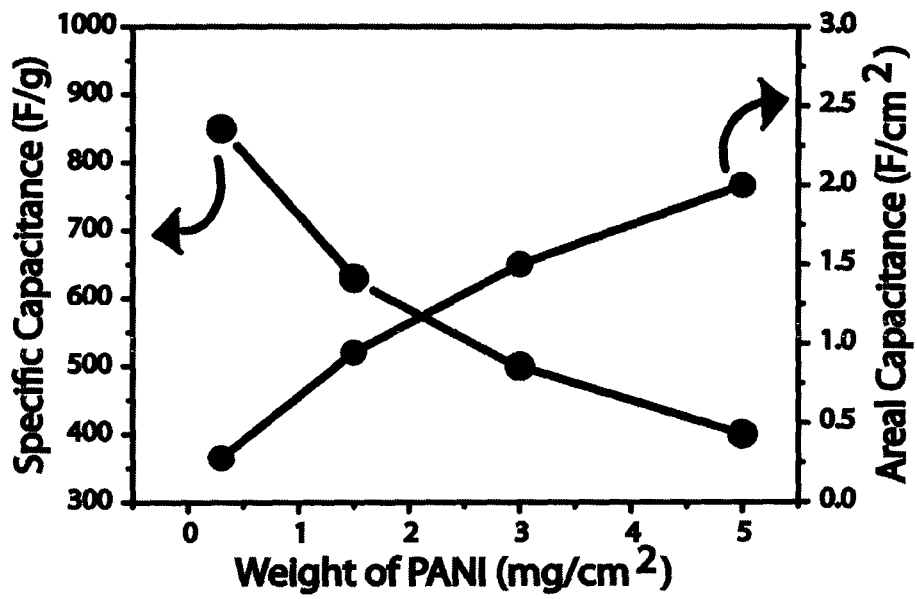
Figure 7 (I)
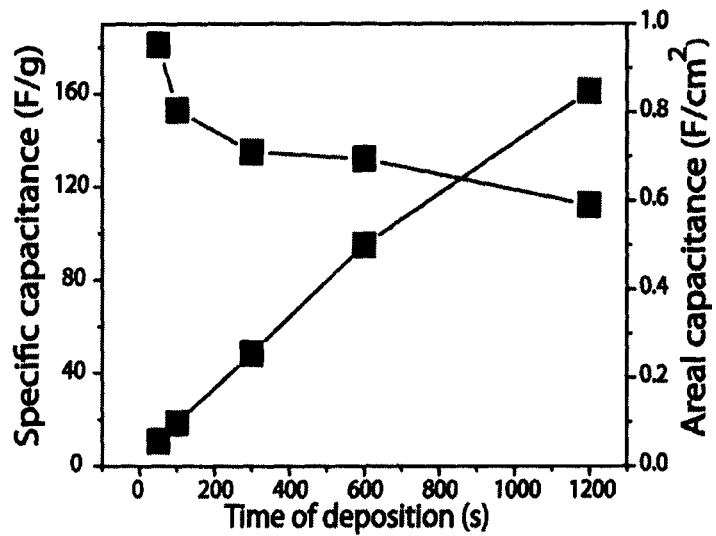
Figure 7 (II)

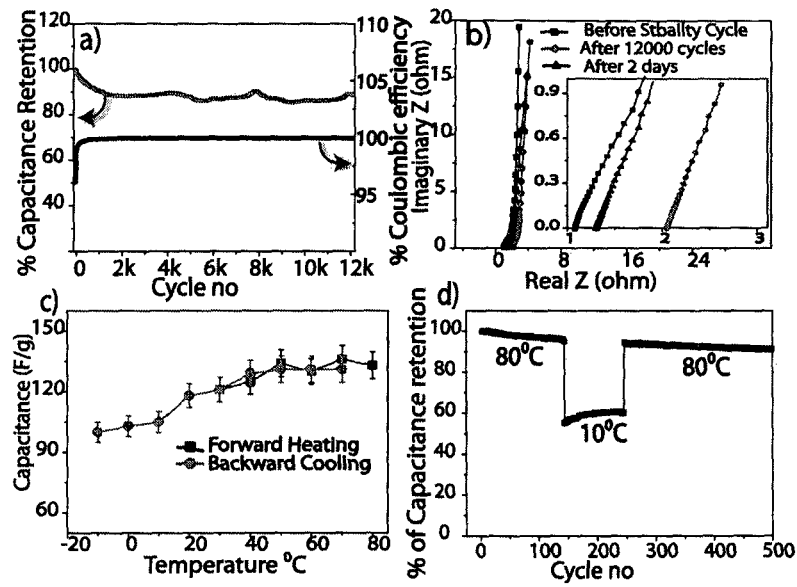
Fig 14-a
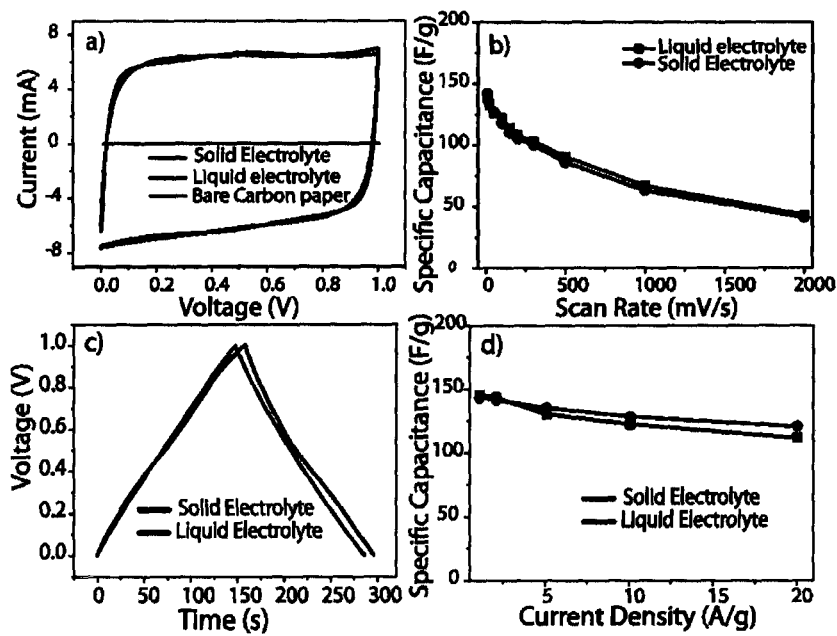
Fig 14-b

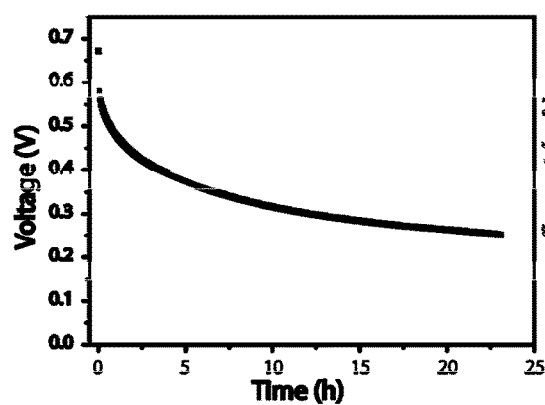
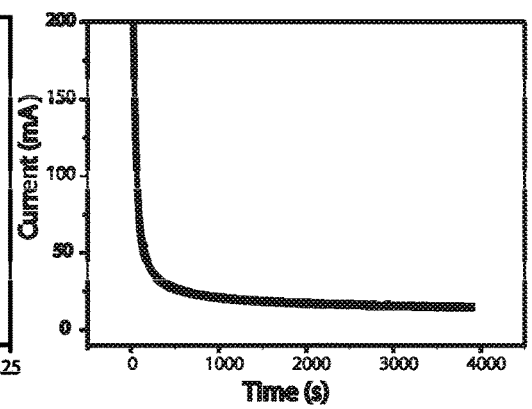
Figure 16 (a)                                    Figure 16 (b)

ALL-SOLID-STATE-SUPERCAPACITOR AND A PROCESS FOR THE FABRICATION THEREOF

TECHNICAL FIELD OF INVENTION

The present invention relates to all-solid-state supercapacitor (ASSP) with enhanced electrode-electrolyte interface which gives very high specific capacitance, areal capacitance and very low internal resistance (ESR). The invention is particularly directed to the fabrication of all-solid-state supercapacitor by intercalation of solid electrolyte inside the conducting porous substrate coated with a charge storage electrode material to achieve the desired effect.

BACKGROUND OF THE INVENTION

Developing methods for efficient energy storage systems, which is also environmentally benign, has been an emerging field in the research programmes due to intermittent nature of energy from the renewable energy sources. Among the various energy storage devices, energy storage systems such as batteries and supercapacitors, which store energy electrochemically are highly preferred due to their efficient storage capacity and also since the processes are environmentally friendly.

Electrochemical supercapacitors, as potential candidates for energy storage, are very promising over batteries such as lithium ion batteries in terms of their high power density, fast charge-discharge rate, high columbic efficiency and long cycle life.

However, liquid electrolytes in the conventional electrochemical energy storage devices raise safety issues and thus require high-standard safety encapsulation materials and technology. Replacement of liquid electrolyte in the energy storage devices using a solid counterpart is very promising for the thin, light, cheap and flexible future devices.

Polymer electrolytes have been extensively studied as electrolytes in supercapacitors and lithium batteries. Among the various polymer electrolytes, gel/plasticised electrolytes[6] show ambient conductivity and desirable mechanical properties and are promising as electrolyte materials to replace conventional liquid electrolyte in supercapacitor. Many of the earlier studies utilized gel/plasticised electrolyte to replace conventional liquid electrolyte in supercapacitor. However, the use of gel as a film between the electrodes resulted in low electrode-electrolyte interfacial area which in turn resulted in poor charge storage properties.

Apart from the low charge storage property, the above strategy increases the total device resistance due to high contact resistance[9] arising from the low integrity of electrode electrolyte material. Very low internal resistance (or ESR) for storage device is highly desirable as the power rate of the device is determined by the relation $P_{max} = v^2/4R$.

In order to replace liquid electrolyte from the supercapacitor (or lithium battery and fuel cell) with solid counterpart, there is a need for an electrode-electrolyte interface that can mimic the liquid-solid interface and yet provide enhanced electrode-electrolyte interface which can help the device to attain a very low ESR, which leads to high specific capacitance, areal capacitance and show excellent cycle stability.

All solid state supercapacitors are known in the art and are disclosed in patents/Patent applications such as US2012014038, US2013083452, WO201401194, CN102509637, and CN103337376 among others. However, the all-state solid supercapacitors known in the art have the following limitations/disadvantages:

i. They show low specific capacitance and areal capacitance.
ii. Current collector is used. During electrode making additive like conducting carbon and binder are used.
iii. Complicated fabrication strategy is used.

The present inventors have therefore focussed in providing all solid state supercapacitor with enhanced electrode-electrolyte interface which gives very high specific capacitance, areal capacitance and shows very low internal resistance (ESR).

OBJECTIVE OF THE INVENTION

The main objective of the present invention is to provide all-solid-state supercapacitor (ASSP) with enhanced electrode-electrolyte interface which gives very high specific capacitance, areal capacitance and very low internal resistance (ESR).

Another objective of the present invention is to fabrication of all-solid-state supercapacitor by intercalation of solid electrolyte inside the conducting porous substrate coated with a charge storage electrode material to achieve the desired effect.

SUMMARY OF THE INVENTION

In accordance to the above challenges, the present invention provides a simple and highly scalable fabrication of all-solid-state supercapacitor with enhanced electrode-electrolyte interface which gives very high specific capacitance and areal capacitance and show very low internal resistance (ESR).

In an aspect, the present invention provides an efficient strategy for the fabrication of all-solid-state supercapacitor comprising intercalation of solid-state polymer electrolyte (component C) inside a conducting porous substrate (component A) coated with a polymer electrode material (component B) to achieve the desired effect.

In another aspect, the present invention provides an all solid-state supercapacitor with improved performance comprising of components A, B and C where the said component A comprises of conducting porous part/substrate selected from Carbon paper, Carbon cloth, Nickel foam, 3D-graphene; said B component comprises of electrode material selected from conducting polymer selected from polyaniline (PANI), polythiophene, polypyrrole, Polyethylene Dioxythiophene (PEOT) and such like, metal oxide selected from manganese oxide, cobalt oxide, nickel oxide, ruthenium oxide, iron oxide, tin oxide, indium oxide, bismuth oxide, vanadium oxide, graphene and component C comprising of a conducting solid electrolyte material, selected from polymer electrolyte such as gel/plasticized electrolyte, PVA (poly vinyl alcohol)/Acid or Base or Salts, PEO (polyethyleneoxide)/Acid or Base wherein the acid is selected from acid such as $H_2SO_4$, $H_3PO_4$, $HClO_4$; salts such as LiCl, $LiClO_4$, KCl; Polyethylene dioxythiophene (PEOT), Nafion™, PBI, and the like.

Accordingly, the present invention provides an all solid state super capacitor comprising:
  a first electrode structure;
  a second electrode structure compressed against the first electrode structure; and characterized in that:
  each of the first and the second electrode structures comprises a three dimensional collector structure defining plurality of pores; wherein an electrically conducting polymeric material occupies at least a part of the pores and an electrolyte material occupies at least a part of the remaining pores and a spacing between the first and the second electrode structures.

In another embodiment of the present invention, the three dimensional collector structure is selected from carbon paper, carbon clot, nickel foam and 3D-graphene.

In still another embodiment of the present invention, the electrically conducting polymeric material is selected from polyaniline (PANI) and polyethylene dioxythiophene (PEOT).

In still another embodiment of the present invention, the electrolyte material is selected from polymer electrolyte such as gel/plasticized electrolyte, PVA (poly vinyl alcohol)/Acid or Base or Salts, PEO (polyethylene oxide)/Acid or Base, wherein the acid is selected from acid is selected from $H_2SO_4$, $H_3PO_4$, $HClO_4$; salts selected from LiCl, $LiClO_4$, KCl.

In still another embodiment of the present invention, the electrically conducting polymeric material is selected from polyaniline in the range of 0.3-5 $mg/cm^2$.

In still another embodiment of the present invention, the electrically conducting polymeric material is selected from Polyethylene dioxythiophene (PEOT), in the range of 0.6-16 $mg/cm^2$.

In yet another embodiment of the present invention, the weight of the three dimensional collector structure is in the range of 12.5-13.5 mg.

In yet another embodiment of the present invention, the $H_2SO_4$-PVA solid electrolyte comprises 48% H2SO4, 48% PVA and remaining is water.

In yet another embodiment of the present invention, said super capacitor is stable up to about 10000-12000 cycles with columbic efficiency of 100%.

In still another embodiment of the present invention, said super capacitor is having specific conductance of 850-400 F/g, areal capacitance of 255-2000 $mF/cm^2$ and internal resistance of 1 $\Omega/cm^2$.

In yet another embodiment of the present invention, a method of fabricating all solid state super capacitor comprising the steps of:
  i. providing a three dimensional collector structure defining plurality of pores;
  ii. coating or loading an electrically conducting polymeric material on to the collector structure of step (i);
  iii. loading an electrolyte material into the collector structure of step (ii); and
  iv. compressing the two collector structure of step (iii) loaded with electrically conducting polymeric material and electrolyte material together to obtain all-solid-state-super capacitor.

In yet another embodiment of the present invention, the electrically conducting polymeric material is selected from polyaniline (PANI) or Polyethylene dioxythiophene (PEOT).

In another embodiment of the present invention, the electrically conducting polymeric material is selected from polyaniline (PANI), is roll coated using K-coater on to the porous carbon paper of step (i).

In another embodiment of the present invention, the electrically conducting polymeric material selected from Polyethylene dioxythiophene (PEOT) is electrodeposited on to the porous carbon paper of step (i).

In yet another embodiment of the present invention, the electrically conducting polymeric material is selected from polyaniline is roll coated on to the porous carbon paper in the range of 0.3-5 $mg/cm^2$.

In yet another embodiment of the present invention, the electrically conducting polymeric material is selected from Polyethylene dioxythiophene (PEOT), is electrodeposited on to the porous carbon paper in the range of 0.3-8 $mg/cm^2$.

In still another embodiment of the present invention, the electrolyte material is selected from polymer electrolyte such as gel/plasticized electrolyte, PVA (poly vinyl alcohol)/Acid or Base or Salts, PEO (polyethyleneoxide)/Acid or Base, wherein the acid is selected from acid is selected from $H_2SO_4$, $H_3PO_4$, $HClO_4$; salts selected from LiCl, $LiClO_4$, KCl.

In still another embodiment of the present invention, the weight of the collector structure is in the range of 12.5-13.5 $mg/cm^2$.

In still another embodiment of the present invention, the $H_2SO_4$-PVA solid electrolyte comprises 48% H2SO4, 48% PVA and remaining is water.

In the present invention, the deposition of electrically conducting polymeric material (component B) on three dimensional collector structure (component A) can be carried out by Hydrothermal, Electrochemical deposition, vapour deposition or roll coating technique. The solid polymer electrolyte is prepared by a process selected from ex-situ process, wet chemistry and such like known in the art.

In yet another aspect, the invention provides fabrication of all solid state supercapacitor with enhanced electrode-electrolyte interface having high specific conductance of 850-400 F/g, areal capacitance of 255-2000 $mF/cm^2$ with internal resistance of 1 $\Omega/cm^2$ comprising roll coating or electrodepositing PANI or PEOT on to the surface of 3D porous carbon paper followed by loading solid polymer electrolyte selected from PVA-$H_2SO_4$ and compressing two carbon paper loaded with electrode and solid electrolyte together to form all-solid-state-supercapacitors with very high interfacial area and very low resistance.

DESCRIPTION OF DRAWINGS

FIG. 6(I): Cross sectional SEM images of all-solid-state supercapacitor with different loading a) 0.3 $mg/cm^2$ b) 1.5 $mg/cm^2$ c) 5 $mg/cm^2$.

FIG. 7. Areal capacitance Vs Specific capacitance of all-solid-state supercapacitor calculated from charge-discharge method. (7(I)-PANI), 7(II)-(PEDOT).

FIG. 14 (a): Various performance features of the solid-state supercapacitor made from CP-300: a) capacitance stability and columbic efficiency during the continuous charge-discharge cycles done at 5 A/g; b) Nyquist plots of the device before and after the stability test; the magnified view of the high frequency region is given in the inset; c) temperature dependent capacitance of PEDOT in the device; d) stability of the device in terms of its capacitance with respect to the cycling of the operating temperature.

FIG. 14(b): Comparison of the performances of the solid- and liquid-state devices made from CP-300: a) comparison of the cyclic voltammograms of the devices taken at 50 mV/s; b) specific capacitance of PEDOT in the devices measured at different scan rates; c) charge-discharge profile of the devices taken at 0.5 A/g; d) specific capacitance of PEDOT in the devices measured at different current densities.

FIG. 16. a) Potential drop w.r.t time measured by raising at 0.8 V b) Leakage current measured by keeping device at 0.8V.

DETAILED DESCRIPTION OF THE INVENTION

Figure 1:
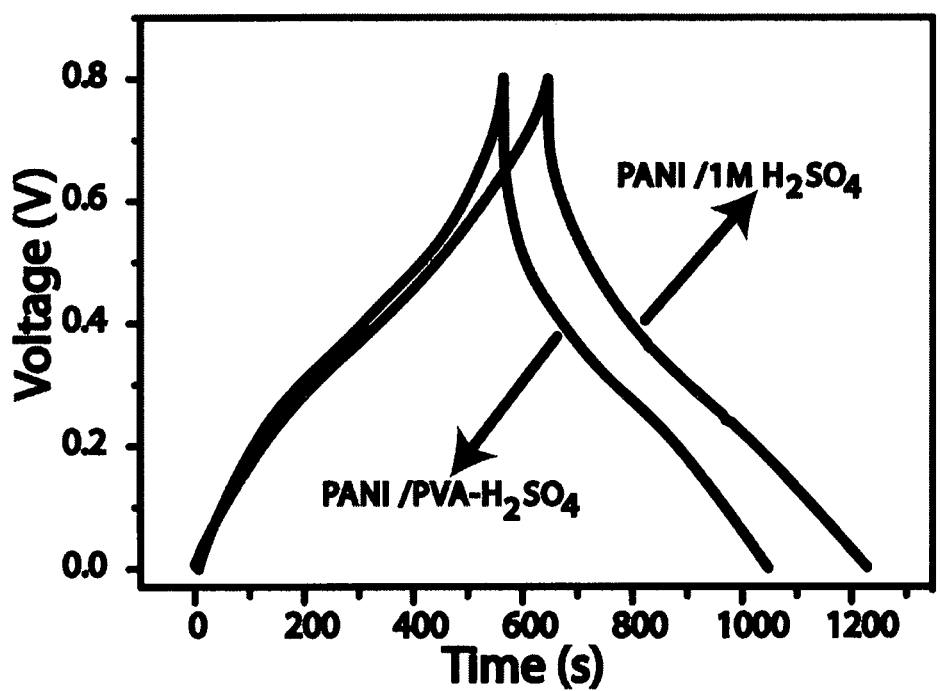
FIG. 1: Comparison of charge-discharge curve of PANI coated carbon paper in 0.5M $H_2SO_4$ and PVA-$H_2SO_4$ done at 0.5 A/g current density.

The present invention relates to a novel fabrication of all-solid-state supercapacitors (ASSP) with enhanced electrode-electrolyte interface which gives very high specific capacitance and areal capacitance and show very low internal resistance (ESR).

The present invention relates to fabrication of all-solid-states supercapacitor with enhanced electrode-electrolyte interface which gives very high specific capacitance and areal capacitance and show very low internal resistance (ESR) comprising intercalation of solid-state polymer electrolyte (component C) inside a conducting porous substrate (component A) coated with a conducting electrode material (component B) to achieve the desired effect.

The component A comprises of three dimensional collector structure selected from carbon paper, carbon cloth, nickel foam, 3D-graphene. To achieve the high electrode-electrolyte interface architecture, the present invention preferably uses 3D porous carbon paper as (component A) having very low sheet resistance (0.26 Ω/squire), low density (0.4 g/cc) and high porosity (97%) The highly 3-D porous carbon paper act as current collector and can accommodate both the electrode material and polymer electrolyte.

The electrically conducting polymeric material (component B) is selected from group of conducting polymers such as polyaniline, polythiophene, polypyrrole, polyethylene dioxythiophene, and the like; from metal oxide such as manganese oxide, cobalt oxide, nickel oxide, ruthenium oxide, iron oxide, tin oxide, indium oxide, bismuth oxide, vanadium oxide etc. The conducting polymer is preferably selected from polyaniline (PANI) or Polyethylene dioxythiophene (PEOT). PANI is known for its very high theoretical capacitance (>1000 F/g) even though bulk PANI shows less than 300 F/g due to its poor conductivity and low surface area. However, the porous carbon fibre paper helps for improving the specific capacitance of PANI due to its increased electrode-electrolyte interfacial area and conductivity in liquid as well as solid electrolyte.

The conducting solid electrolyte (component C) is selected from gel/plasticized electrolyte, polymer electrolyte such as PVA (poly vinyl alcohol)/Acid or base or salts PEO (polyethyleneoxide)/acid or base or salt/plasticizer, Nafion, doped PBI, poly ionic liquid etc. The acid is selected from $H_2SO_4$, $H_3PO_4$, $HClO_4$ and the salts are selected from LiCl, $LiClO_4$, KCl etc. Particularly, conducting solid electrolyte used in the instant invention is selected from PVA-$H_2SO_4$.

It was observed by the present inventor that due to the enhanced electrode-electrolyte interface, the ion transport between polymer matrix and electrolyte during charge-discharge becomes more facile in case of PANI or PEOT coated carbon paper. Further, the conventional approach of usage of film or dipping does not result in the expected interface. The present invention provides PVA-$H_2SO_4$ gel polymer electrolyte by in-situ solidifying inside the porous current collector which is coated with PANI or PEOT.

The component (B) selected from PANI or PEOT is coated/deposited on to the porous carbon paper (A) by roll coating or electro deposition method. The weight of the highly 3-D porous carbon papers is in the range of 12.5-13.5 mg/$cm^2$. The carbon paper used in the instant supercapacitor possesses very low sheet resistance (0.26 Ω/square), low density (0.4 g/cc) and high porosity (97%).

PANI is loaded/coated on to the porous carbon paper by roll coating using K-coater, wherein PANI is loaded in the range of 0.3-5 mg/$cm^2$.

Poly aniline is prepared by a method known in the art and comprises addition of ice cold solution of aniline in 1M HCl to pre-cooled $(NH_4)_2S_2O_8$ in 1M HCl drop wise, stirring to obtain green PANI solution which is further washed, filtered and dried.

PEOT (component B) is loaded on to the porous carbon paper by electro-deposition method. PEOT is loaded in the range of 0.3-8 mg/$cm^2$.

The device has an excellent stability of 10000-12000 cycles with columbic efficiency of 100%, a very low leakage current of 15 µA and energy density of about 14.3 Wh/kg. The whole device is very light with total weight of the device in the range of 40-60 mg and the supercapacitor of the instant invention shows a capacitance of 0.6 to 12 F/g in terms of the whole device weight. Further, the device is observed to be consistent even under wide range of humidity (30 to 80%) and temperature (−10 to 80° C.) conditions.

The invention provides a method of fabricating all solid state supercapacitor with enhanced electrode-electrolyte interface characterized by high specific conductance of 850-400 F/g, areal capacitance of 255-2000 mF/cm$^2$ with internal resistance of 1 Ω/cm$^2$ comprising;
i. providing a three dimensional collector structure defining plurality of pores;
ii. coating or loading an electrically conducting polymeric material on to the collector structure of step (i);
iii. loading an electrolyte material into the collector structure of step (ii); and
iv. compressing the two collector structure of step (iii) loaded with electrically conducting polymeric material and electrolyte material together to obtain all-solid-state-super capacitor.

In the fabrication process, polyaniline (PANI) is made into a paste with NMP and coated onto 1 cm$^2$ area of 3D porous carbon paper (non teflonated) having a dimension of 1×2 cm$^2$ using K-control coater. PANI to NMP ratio ((2-20 mg/0.5 ml)) is fine tuned to get uniform deposition of PANI inside the carbon matrix. Different loading of PANI is obtained by varying concentration PANI in NMP and the electrodes are dried overnight. For making solid state supercapacitors, PVA-H$_2$SO$_4$ aqueous solution is used as electrolyte and is coated on to PANI coated carbon paper electrode using K-control coater on both side and dried using air gun. Two electrodes are taken after formation of fine layer on one side and are compressed together using an ambient pressure. The required electrical contacts from the electrodes were made by using metal crocodile clips.

Similarly, polyethylenedioxythiophene (PEDOT) was deposited onto the porous carbon paper by electro-deposition technique followed by intercalating the matrix with polyvinyl alcohol-sulphuric acid (PVA-H$_2$SO$_4$) gel electrolyte. The electrodeposited layer of PEDOT maintained a flower-like growth pattern along the treads of each carbon fibre. This morphology and the alignment of PEDOT led to enhanced surface area and electrical conductivity whereas, the pores in the system enabled effective intercalation of the polymer-gel electrolyte.

Devices were made by using polypropylene as a separator in between the two electrodes and tested in 0.5 M H$_2$SO$_4$. For making the solid-state supercapacitors, PVA-H$_2$SO$_4$ aqueous solution was used as electrolyte. They were coated on to PANI coated carbon paper electrode using K-control coater on both side and dried using air gun. Two electrodes are taken after formation of fine layer on one side and compressed using an ambient pressure. The film formed in between the electrode prevents the short circuit by acting as a separator. The required electrical contacts from the electrodes are made by using metal crocodile clips.

It was observed that porosity was still sufficient inside the PANI/carbon paper or PEOT/carbon paper for making intercalated electrode-gel electrolyte interface thus mimicking the liquid nature inside the carbon matrix.

Figure 2:
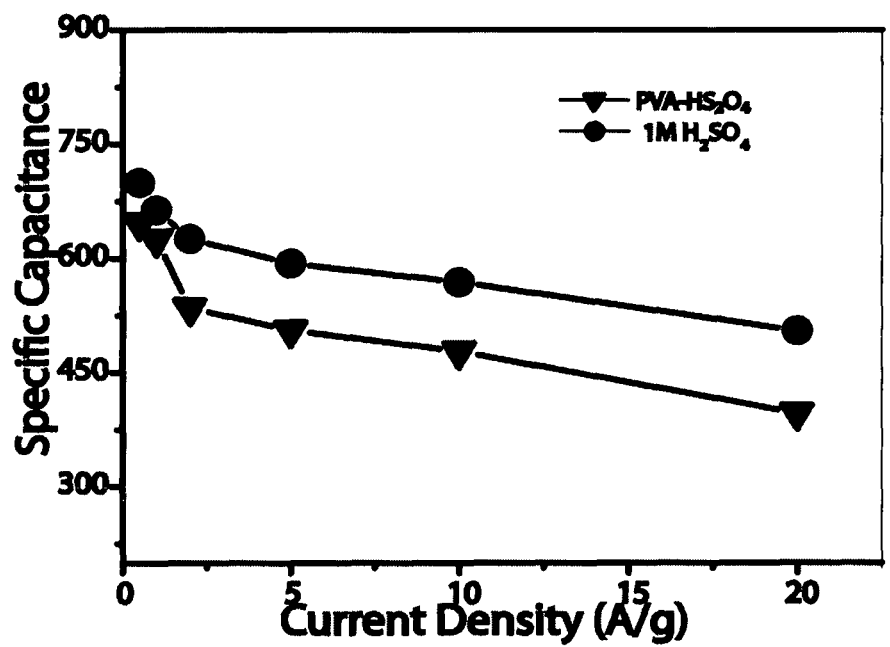
FIG. 2: Capacitance at varied current density of PANI coated carbon paper in 0.5M $H_2SO_4$ and PVA-$H_2SO_4$.
Figure 3:
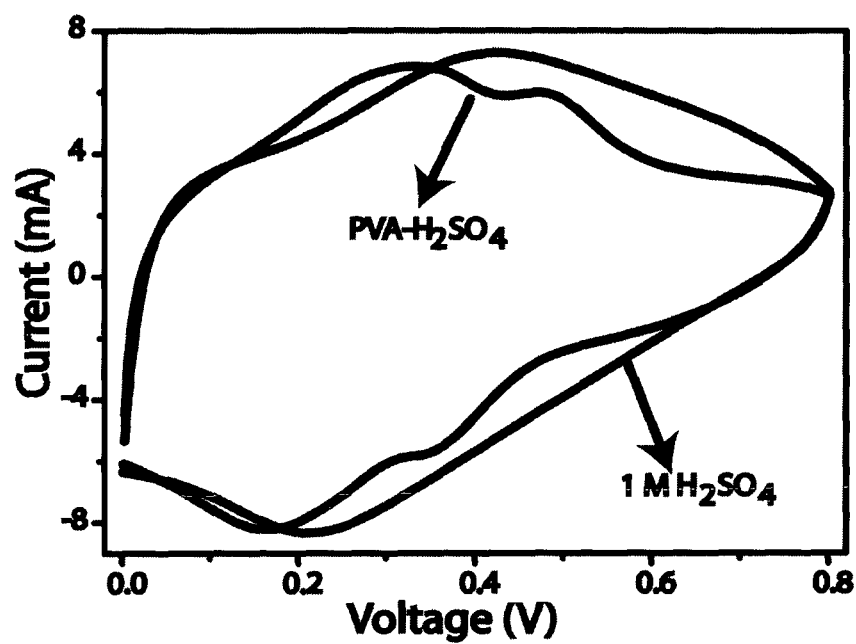
FIG. 3. Comparison of cyclicvoltamogram of PANI coated carbon paper in 0.5M $H_2SO_4$ and PVA-$H_2SO_4$ at scan rate of 10 mV/s.
Figure 4:
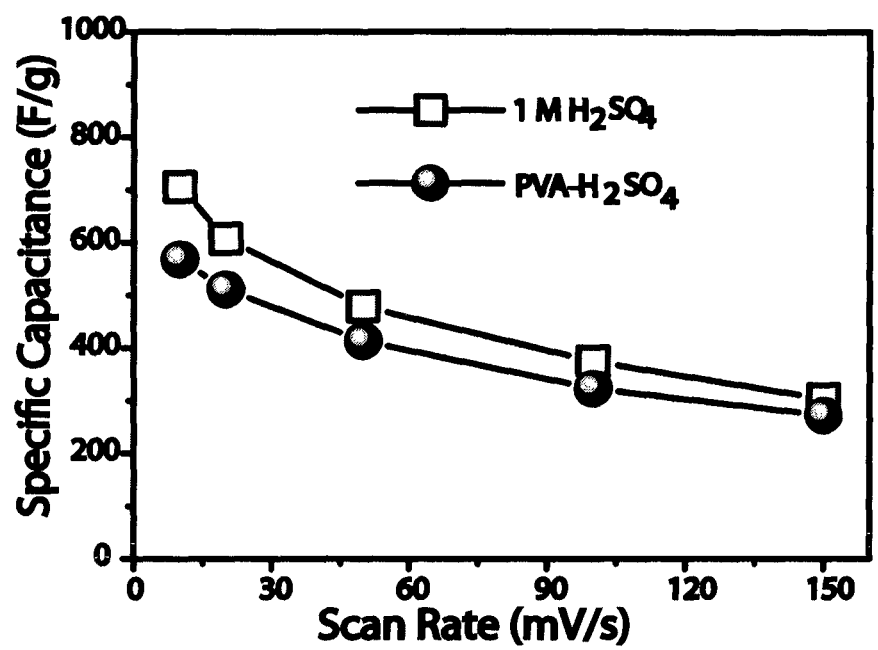
FIG. 4: Capacitance of PANI coated carbon paper in 0.5M $H_2SO_4$ and PVA-$H_2SO_4$ at various scan rates.

The enhanced interface helped the solid device (ASSP) to perform like a liquid counterpart showing a capacitance of 850-400 F/g at a current density of 0.5 A/g shown in FIG. 1, where the areal capacitance is 1 F/cm$^2$. The retention of capacitance of ASSP with the current density is shown in FIG. 2 and ASSP is able to retain 400 F/g even at a current density of 20 A/g (FIG. 2). The capacitance value obtained from the cyclic voltammetry for the all-solid-state supercapacitor is 568 F/g at 10 mV/s compared to 700 F/g for liquid electrolyte (FIG. 3). High integrity of the electrode-electrolyte helps the device to attain a very low ESR of 1Ω. In another embodiment, the present invention provide a comparative analysis of porous carbon paper and a plane current collector (grafoil) coated with PANI and tested in liquid electrolyte to establish the role of porous current collector (porous carbon paper) towards improving the capacitance by enhancing the electrode-electrolyte interfacial area.

The comparative study clearly illustrates the PANI coated carbon paper show a very high capacitance of 695 F/g at 10 mV/s (FIG. 2a) which is about 2.3 times higher than PANI coated on to the plane current collector, Grafoil. The charge-discharge method also show similar results in which PANI/carbon paper shows 699 F/g and PANI/Grafoil shows 300 F/g at 0.5 A/g current density (FIG. 2b). Capacitance retention in PANI coated carbon paper was also superior which show 72% retention of its initial capacitance even with a fast discharging using a current density of 20 A/g (FIG. 2c). Whereas PANI/Grafoil showed only 50% retention when current density varied from 0.5 A/g to 20 A/g (FIG. 2c).

The comparative study clearly indicates the utilisation of 3D porous carbon paper in the instant invention which helps the PANI to attain high surface area by distribution of electrode material inside the 3-D network of porous carbon paper electrode. The comparative study is further detailed in examples hereinbelow.

Industrial Advantages:

The present invention provides a novel approach in the design of all-solid-state supercapacitor by intercalated polymer electrolyte inside the PANI/PEOT coated carbon paper with enhanced electrode-electrolyte interface. The enhanced electrode-electrolyte integrity helps the solid device to perform like a liquid counterpart and shows a high specific capacitance of 800-400 F/g with an areal capacitance of 255-2000 mF/cm$^2$ and able to retain 62% of capacitance at 20 A/g. The high integrity of the electrode-electrolyte helps the device to attain a very low ESR of 1Ω. Apart from this the device show excellent cycle stability of 10000-20000 with a columbic efficiency of 100%. Energy density of the device is 14.3 Wh/kg which is the highest reported value for solid-state-supercapacitor and show a very low leakage current of 16 µA.

Following examples are given by way of illustration therefore should not be construed to limit the scope of the invention.

EXPERIMENTAL

Example 1: Polyaniline Synthesis

To 1 ml of aniline in 50 ml of 1M HCl in ice cold solution, pre-cooled (NH$_4$)$_2$S$_2$O$_8$ (1:2 M ratio with aniline) in 50 ml 1M HCl is added drop wise and stirred for 6 hr. The green PANI solution is filtered and washed with DI water and dried at 60° C.

Example 2: Preparation of PVA-H$_2$SO$_4$Film

Figure 5I:
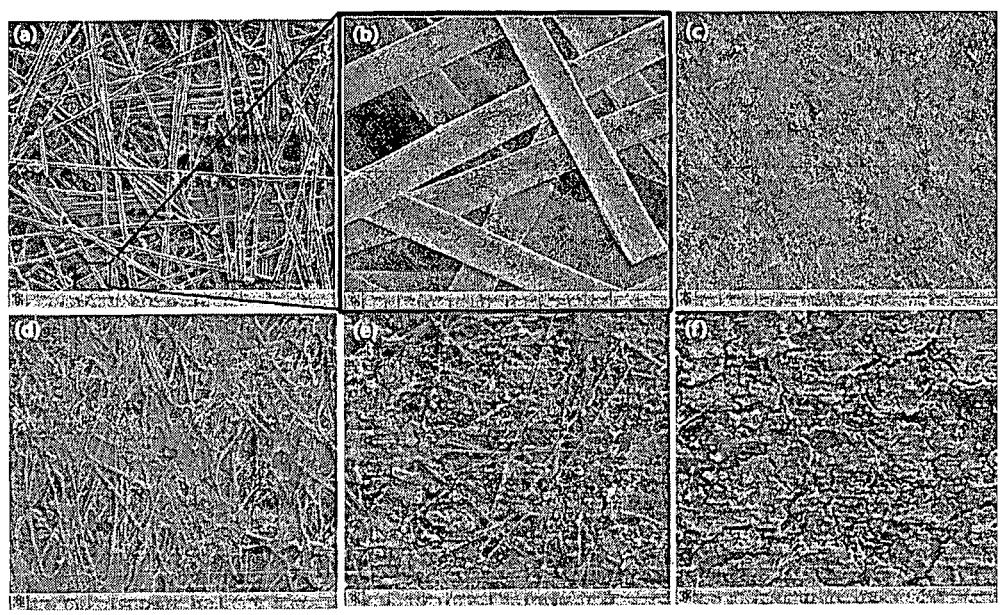
FIG. 5(I): SEM images of a& b) bare carbon paper c) Grafoil® PANI coated carbon paper with loading of d) 0.3 $mg/cm^2$ e) 1.5 $mg/cm^2$ f) 5 $mg/cm^2$.

Approximately 2 gms of PVA is weighed and transferred on to 100 ml RB flask containing 20 ml of de-ionized water (DI) to prepare 10 wt % PVA solutions. The mixture is heated at 850° C. with constant stirring until clear solution of PVA is obtained after which it is cooled to room temperature (27° C.). Approximately 2 gms of concentrated $H_2SO_4$ is added to the solution and stirred gently for 30 minutes to obtain 1:1 PVA-$H_2SO_4$ solution. Example 3: Preparation of electrode by coating of PVA polymer on to the porous carbon paper:

Example 3: Preparation of Electrode by Coating of PVA Polymer on to the Porous Carbon Paper Polyaniline was made into a paste with NMP and coated onto 1 cm² area of Torey carbon paper (non teflonated) having a dimension of 1×2 cm² using K-control coater. PANI to NMP ratio was fine tuned to get uniform deposition of PANI inside the carbon matrix. Different loading of PANI was obtained by varying concentration of PANI in NMP. (2-20 mg/0.5 ml) (This varied concentration will result in varied electrode-electrolyte interface (FIG. 5(I)). The electrodes were dried overnight at 100° C. For making solid state supercapacitors, PVA-$H_2SO_4$ aqueous solution is used as electrolyte and is coated on to PANI coated carbon paper electrode using K-control coater on both side and dried using air gun. Two electrodes are taken after formation of fine layer on one side and are compressed together using an ambient pressure.

Example 4: Preparation of Electrode by Electro-Deposition Method of PEOT on to the Porous Carbon Paper Electrochemical Polymerization of EDOT:

Polymerization was carried out in a BioLogic SP-300 Potentio-Galvanostat using 3-electrode systems in which carbon paper was used as the working electrode, Pt was used as the counter electrode and Ag/AgCl was used as the reference electrode. Electrolyte used was acetonitrile containing 0.1 M $LiClO_4$ as supporting electrolyte and 0.1 M EDOT. Before the experiments, nitrogen was passed through the electrolyte to remove any dissolved oxygen. 1 cm² area of carbon paper was kept exposed to electrolyte and remaining part was masked using a Kapton adhesive tape. The experiments were carried out in constant current mode, by maintaining 10 mA/cm² current density. The experiments were repeated for different time durations of 50, 100, 300, 600, 1200 s and the corresponding electrodes are named as CP-50, CP-100, CP-300, CP-600, and CP-1200 respectively. After completion of the electrochemical deposition, the electrodes were washed with acetonitrile solution and dried under IR lamp and the results of the characterization studies are tabulated in Table 4. For making solid state supercapacitors, PVA-$H_2SO_4$ aqueous solution is used as electrolyte and is coated on to PVOA coated carbon paper electrode using K-control coater on both side and dried using air gun. Two electrodes are taken after formation of fine layer on one side and are compressed together using an ambient pressure.

Electrochemical Characterization:

All the electrochemical studies were carried in a BioLogic SP-300 Potentio-Galvanostat. The CV measurements were taken at different scan rates from 10 to 150 mVs$^{-1}$ by maintaining a potential window of 0.8 V. Charge-discharge measurement is done at different current densities (0.5 to 20 A/g) in the potential range of 0-0.8 V. Cycling stability was done by chrono charge-discharge method at 5 A/g current density. Electrochemical impedance (EIS) analysis was carried out from $10^6$ Hz to 0.01 Hz frequency against the open circuit potential with a sinus amplitude of 10 mV $N_{rms}$=7.07 mV). All the EIS data were analysed using an EC-Lab Software V10.19. For comparison, experiments were conducted in a plain current collector using Grafoil® paper as current collector using liquid and solid electrolyte. Leakage current was measured from the plot of current Vs time obtained by charging the cell using a low current density up to 0.8 V and keeping the cell at 0.8V by chrono-amperometric technique. A voltage drop of the cell was measured for 24 hr by charging the cell at 0.8V for 20 minutes followed by measuring the open circuit potential. For all-solid-state supercapacitors having 1.5 mg/cm² loading on each electrode were connected in series to get a working potential of 3V for glowing a LED.

(I) Scanning Electron Microscopy (SEM) and EDAX Elemental Mapping of the Surface of Carbon Paper.

Figure 5:
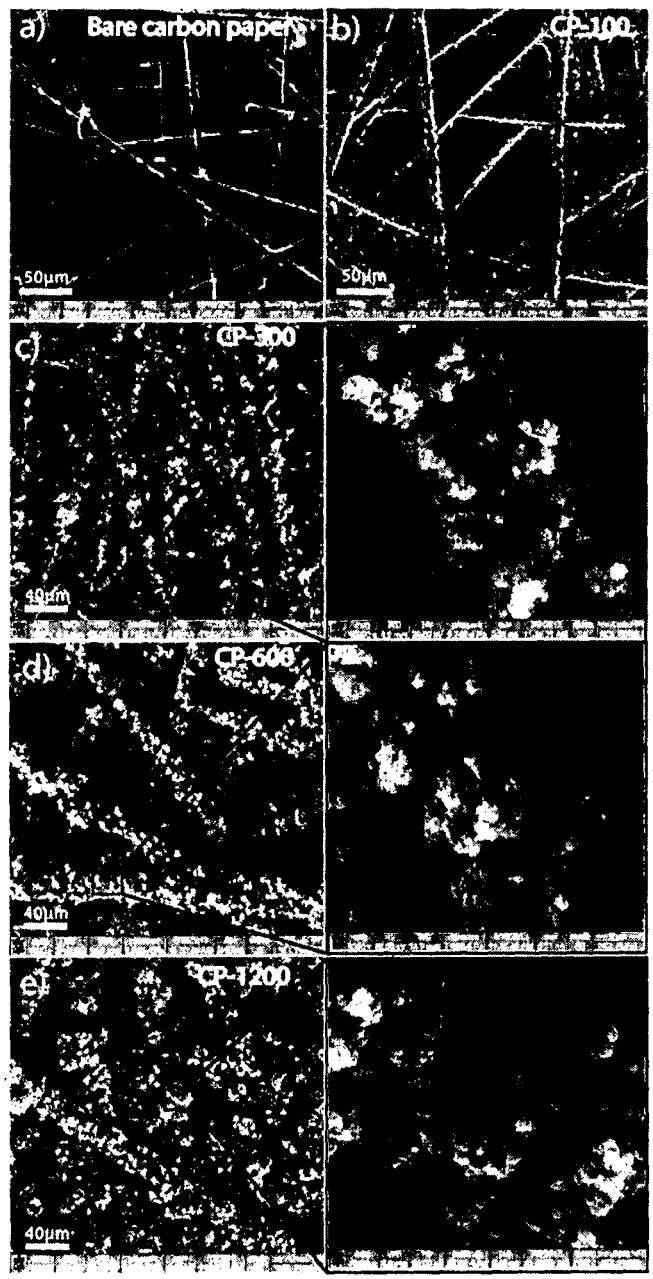
FIG. 5(II). SEM images of the electro-deposited PEDOT on carbon paper; a) bare carbon paper, b) CP-100, c) CP-300, d) CP-600 and e) CP-1200. SEM images in the red boxes are the enlarged portion of the corresponding images in the left side.

SEM and EDAX elemental mapping of the surface of carbon paper showed clear picture of the surface morphology of the device. The bare carbon paper SEM images in FIG. 5 and FIG. 5a-b showed the high porosity and uniform fibres with a diameter of 5 µm. FIG. 5c corresponds to Grafoil® which is plain conducting paper used as current collector for comparison. The SEM image in FIG. 5e showed 1.5 mg/cm² loading of PANI on carbon paper. SEM images in FIG. 5d-f corresponds to different loading of PANI (0.3, 1.5, 5 mg/cm²) on carbon paper. But with increase in loading (5 mg/cm²), the particles were observed to stick at the surface due to which the porosity decreased as depicted in FIG. 5d-f of different loading of PNAI on the substrate.

Figure 6:
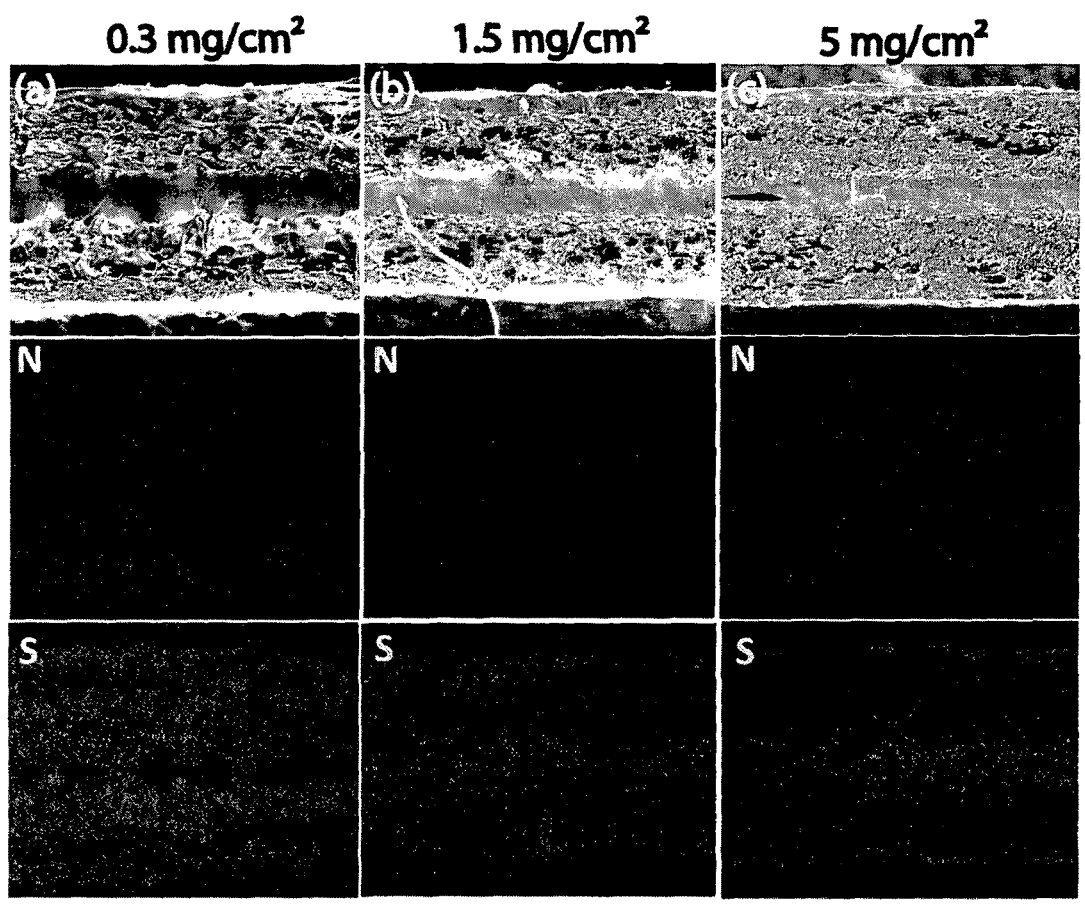
FIG. 6(II): Cross-sectional SEM images of a) solid-state-device made from CP-300; yellow arrow indicates the PVA-$H_2SO_4$ film formed between the electrodes while pressing them together which serves as a separator between the two sandwiched electrodes; b) enlarged image of PVA-$H_2SO_4$ covered PEDOT-carbon fiber corresponding to the red box in the image a), highlighting the high integrity of the electrode components; c) enlarged image corresponding to the area marked within the blue box in the SEM image a), which indicates the upper surface of the device showing highly penetrated PVA-$H_2SO_4$ gel through the PEDOT coated carbon matrix; d) S-elemental mapping along the cross-section of the device as shown in image 'a'.
Figure 8:
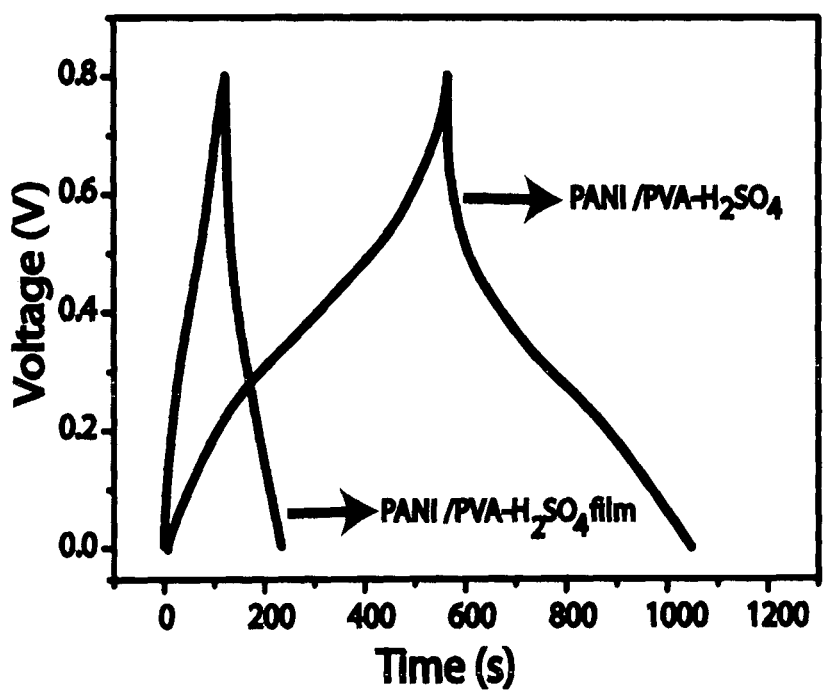
FIG. 8: Comparison of charge-discharge curve of PANI coated carbon paper in PVA-$H_2SO_4$ with and without film done at 0.5 A/g current density.
Figure 9:
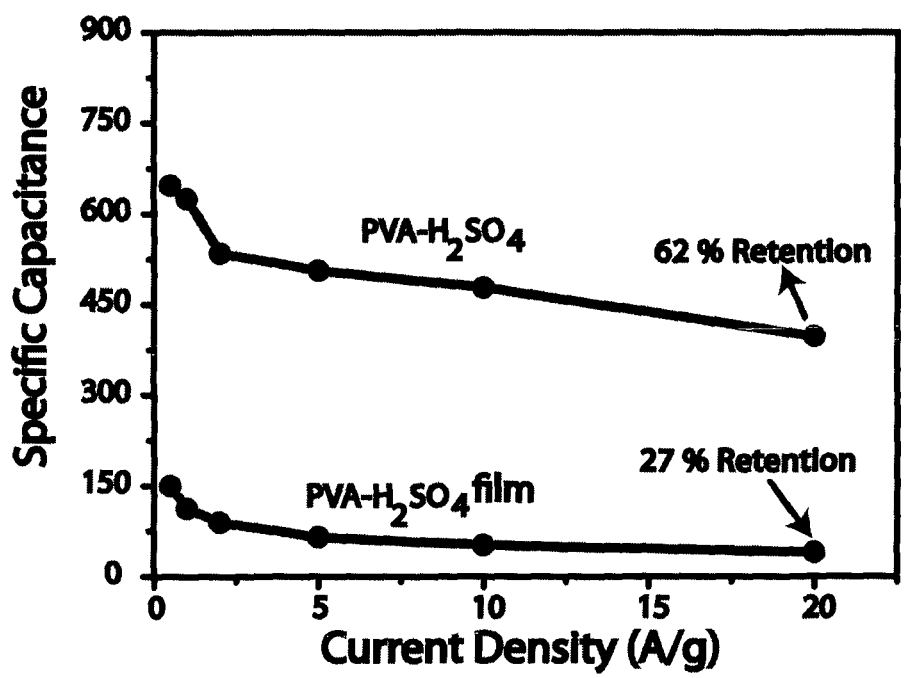
FIG. 9: Capacitance at varied current density of PANI coated carbon paper in PVA-$H_2SO_4$ with and without film.
Figure 17:
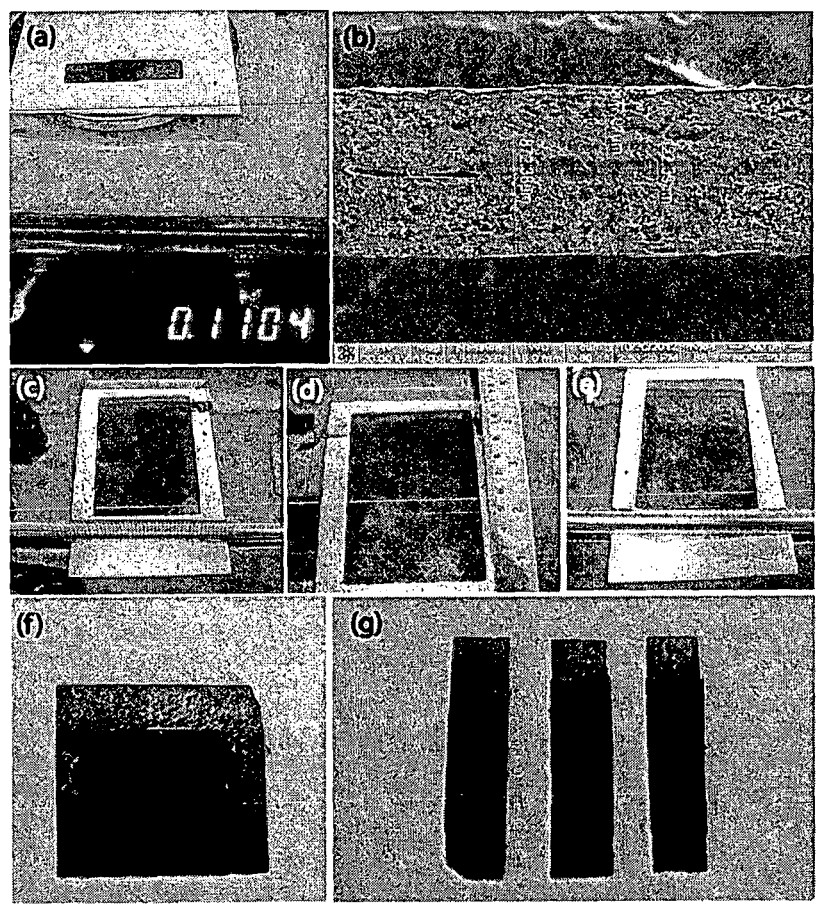
FIG. 17(a) Weight of proto type 1 $cm^2$ all-solid-state-supercapacitor b) Dimension of all-solid-state-supercapacitor c-e) Preparation of 8×8 $cm^2$ capacitor electrodes F & g) different sized supercapacitor.

Cross sectional SEM images and elemental mapping of the devices depict the expected high integrity and enhanced electrode-electrolyte interface (FIG. 6). The total thickness of the device was observed only 0.8 mm which comprises of a fine film in between the electrode and carbon paper with 0.12 mm and 0.3 mm thickness respectively (FIG. 17b). The EDAX elemental mapping shows the intercalated PANI particle and PVA-$H_2SO_4$ inside the carbon fibre matrix. Nitrogen mapping in FIG. 6a corresponds to the cross section of the device with a catalyst loading of 0.3 mg/cm² which shows that PANI is uniformly distributed all over matrix and not only at the surface.

Sulphur mapping at the same spot in the FIG. 6 shows that the sulphur from the PVA-$H_2SO_4$ are diffused on to either side of the film through the carbon fibres and is well Contacted with polyaniline showing better electrode-electrolyte interface. The diffusive nature of solid-electrolyte was observed to decrease with higher loading of PANI. It was therefore clear that higher loading of PANI decreased the intercalating space for the polymer electrolyte as seen in FIG. 6a-c.

(II) The elemental mapping therefore illustrates that interface enhanced electrode-electrolyte interface in solid-state can only be achieved by utilising the porosity of the electrode.

Analysis of Electrochemical Charge Storage Properties of Polyaniline Coated Electrodes Using Cyclic Voltametry (CV) and Chrono Charge-Discharge Method.

Electrochemical charge storage properties of polyaniline coated electrodes using cyclic voltammetry (CV) and chrono charge-discharge methods were analysed initially in acidic medium containing 0.5M $H_2SO_4$. Two PANI coated electrodes were separated by polycarbonate film dipped in electrolyte used for analysis. CV scan rate was varied from 10 mV/s to 150 mV/s and current densities from 0.5 A/g to 20 A/g. Since the present invention uses 2 electrodes for testing, capacitance values calculated from cyclic voltammogram and charge-discharge curve are multiplied by a factor of 2 to obtain capacitance of single electrode.

To establish the role of porous current collector towards the improvement of capacitance by enhancing the electrode-electrolyte interfacial area, Grafoil® was used for comparing with carbon paper. Grafoil® is a plane current collector with high conductivity (FIG. 1c). Capacitance calculated from the cyclicvoltametry (CV) was observed to be 300 F/g for PANI with 1.5 mg/cm$^2$ loading on Grafoil® at 10 mV/s scan rate, as shown in FIG. 2a. This value was in well agreement with the reported capacitance in the literature for polyaniline prepared by the same synthetic procedure. With the same loading of PANI on carbon paper showed a very high capacitance of 695 F/g at 10 mV/s shown in FIG. 2a which is 2-3 times higher than the former. Charge-discharge method also shows similar results in which PANI/carbon paper shows 699 F/g and PANI/Grafoil® shows 300 F/g at 0.5 A/g current density (FIG. 2b). The huge difference indicates clearly the utilisation of high porosity of carbon paper which helps the PANI to attain high surface area by distribution of electrode material inside the 3-D network of porous carbon paper electrode. In case of Grafoil®, due to the plane surface, the obtained surface area was low resulting in poor capacitance The above result clearly indicated the superiority of use of porous substrate as current collector to design all-solid-supercapacitor (ASSP). Porosity of the carbon paper helped the polymer to go inside the carbon matrix very easily and to establish good contact with the carbon fibres rather than filtering at the surface. This in turn resulted in enhanced electrode-electrolyte interfacial area compared to PANI coated on to Grafoil. This strategy was succeeded and reflected in the capacitance of ASSP, they showed a capacitance of 647 F/g at a current density of 0.5 A/g as shown in FIG. 1, where the areal capacitance was 1 F/cm$^2$. The retention of capacitance of ASSP with the current density is shown in FIG. 2 and ASSP was able to retain 400 F/g even at a current density of 20 A/g (FIG. 2).

The specific capacitance and areal capacitance obtained for the polyaniline using porous current collector for the solid state supercapacitor is given below in Table 1. Even at a very high areal capacitance of 2 F/cm$^2$, the device showed a specific capacitance of 400 F/g. The specific capacitance can be reached to 850 F/g with a low loading of 0.3 mg/cm$^2$, where the areal capacitance was 0.28 F/cm$^2$ (FIG. 7). The variations were expected and on increased the loading, the pores were filled and most of the PANI particles stayed at the surface and resulted in the poor penetration of PVA-H$_2$SO$_4$ into the carbon paper. This resulted in the lower electrode-electrolyte interface and it is clear from the comparative 'S' elemental mapping in FIG. 6 a-c. Variation of specific capacitance Vs areal capacitance is given in the FIG. 7 which was calculated from the charge-discharge methods.

Figure 12:
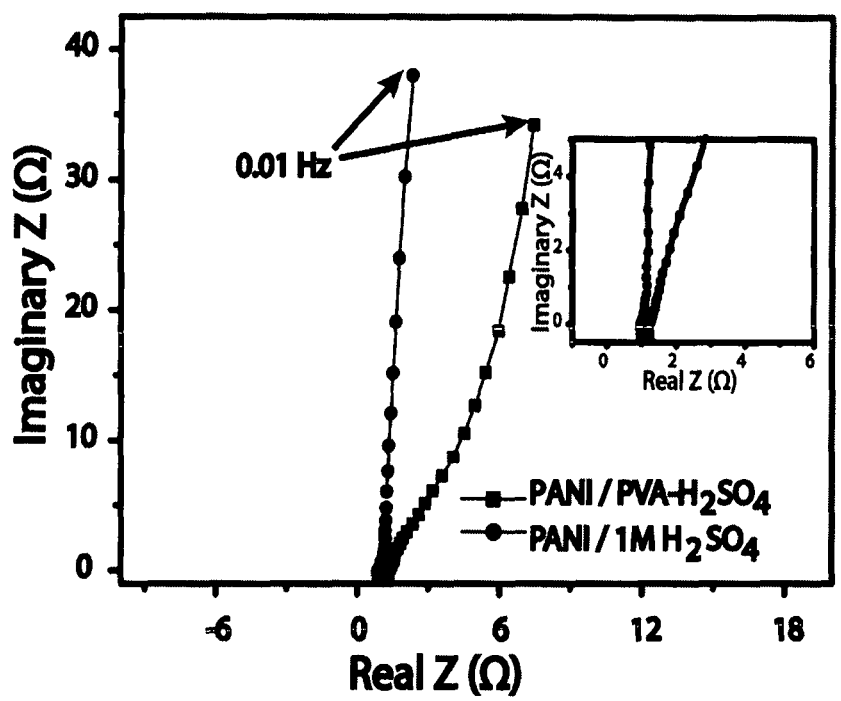
FIG. 12: Comparison of Nyquistplot of all-solid-state supercapacitor using PVA-$H_2SO_4$ with a liquid counterpart using in 0.5M $H_2SO_4$.

Impedance analysis of ASSP confirms the high charge storage properties obtained in CV and chrono charge-discharge method. The equivalent resistant series (ESR) of the device is only 1Ω as taken from the x intercept of the Nyquist plot (FIG. 12).

Figure 10:
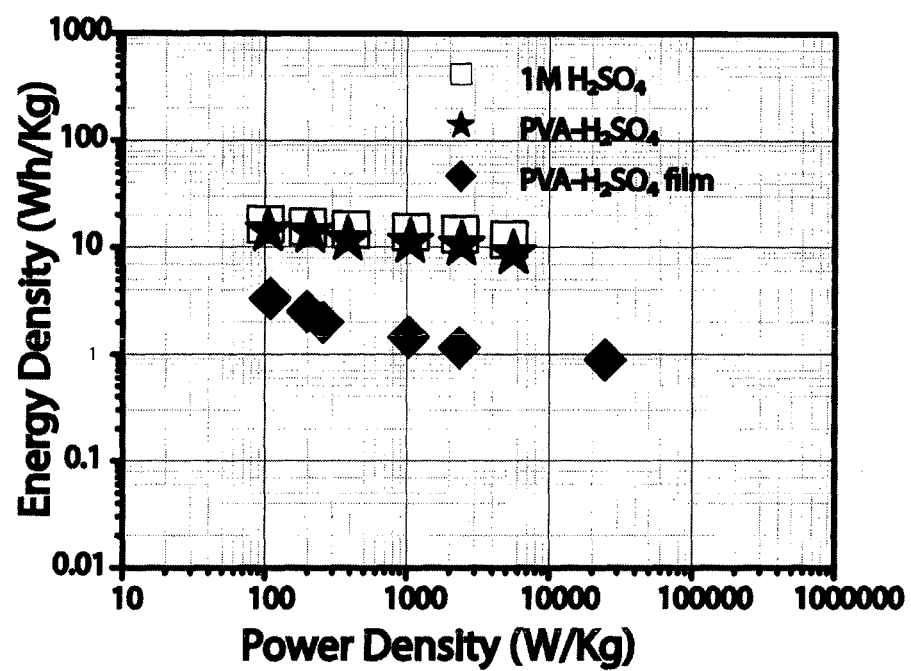
FIG. 10: Ragone plot, Energy density Vs Power density calculated from charge-discharge method.
Figure 11:
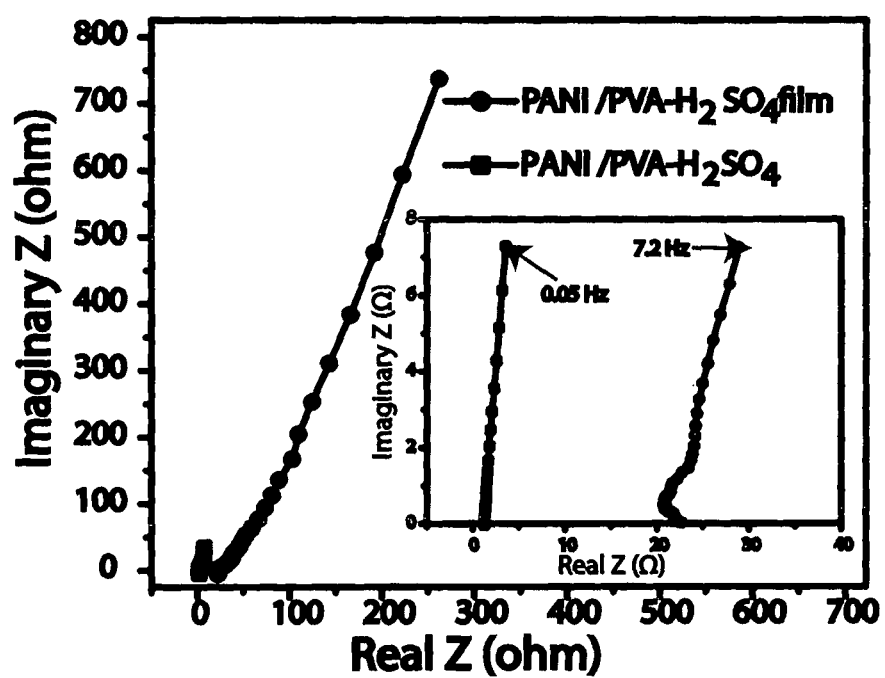
FIG. 11: Nyquistplot of All-solid-state supercapacitor using PVA-$H_2SO_4$ with and without film. Zoomed image of high frequency region in the inset.

Energy density and power density were calculated from the charge-discharge method and corresponding Ragone plot as show in the FIG. 10. The solid device shows 14.3 Wh/kg at a power density of 105 W/Kg compared to 3.3 Wh/Kg of the device which uses a polymer film. A comparative study is given in the Table 1. At higher power rate of 5.6 KW/Kg also the ASSP is able to maintain 8.8 Wh/Kg whereas the film shows only 1.1 Wh/Kg at 2.3 KW/Kg.

Determining Stability of PANI by Chrono Charge-Discharge Method

Figure 13:
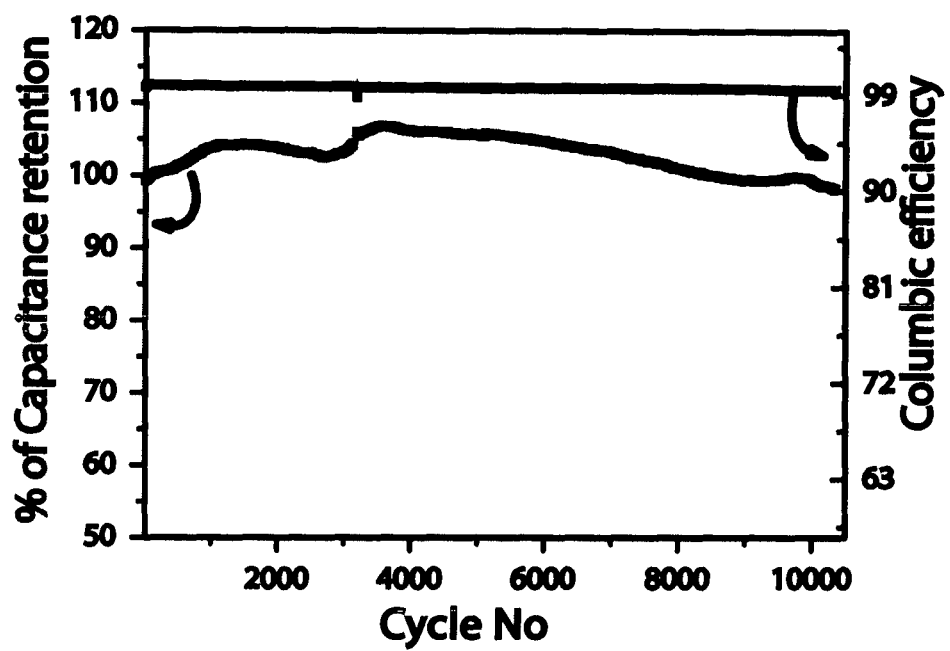
FIG. 13: 10000 cycle stability test of all-solid-state supercapacitor carried at 5 A/g current density.
Figure 15:
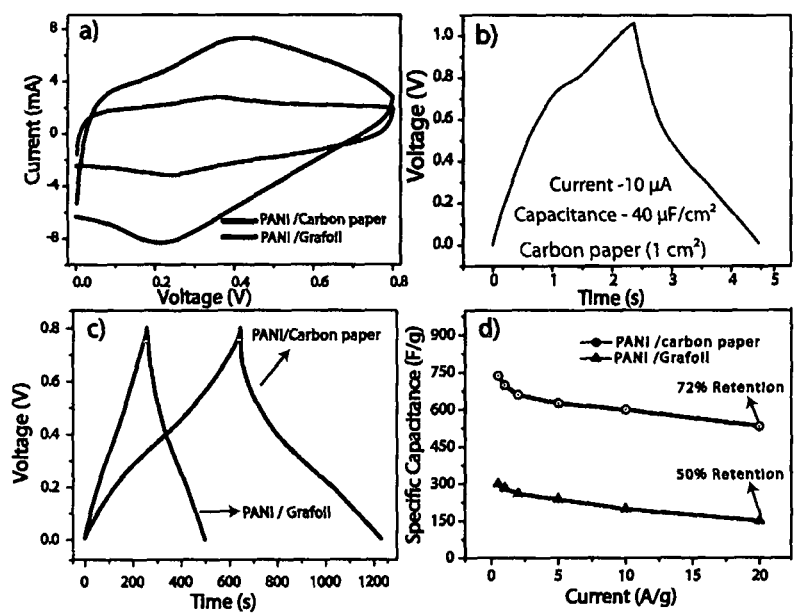
FIG. 15: Comparison of a) cyclic voltammograms at a scan rate of 10 mV/s for the systems made by using porous carbon and Grafoil as the substrates, b) charge-discharge curve of blank carbon paper at a current density of 10 µA, c) charge-discharge profiles at a current density of 0.5 A/g of the PANI coated carbon paper and Grafoil, d) the plots indicating the change in the specific capacitance with current density for the carbon paper and Grafoil based systems. All the experiments are done in 0.5 M $H_2SO_4$ in a 2-electrode assembly.

Extended cycling stability is an essential criterion for any charge storage devices. It was found that the instant design of the supercapacitor not only improves the capacitance but it also improves the stability. 10000 continuous cycling were carried at a current density of 5 A/g of ASSP which showed the capacitance of 638 F/g. % capacitance retention and columbic efficiency during the 10000 cycles are plotted in FIG. 13. Excellent stability was obtained during the cycling and it was found that only less than 2% degradation happened during the cycling and coloumbic efficiency was nearly 100% during the whole cycling. The enhanced stability of PANI in ASSP was clearly explained by the role of PVA as binder. Apart from the role, solid electrolyte matrix in the device PVA holds the poly aniline tightly.

The device of the invention is light weight due to the low density of the carbon paper. The whole device shows only 110 mg (FIG. 17a) including the space given for the contact, which is an inactive space for charge storage. The whole device including the electrolyte shows 12.5 F/g, which is double than the commercially available supercapacitors with liquid electrolyte.

(III) Measuring the Leakage Current

The leakage current was measured by charging at 0.8V and monitoring the current required to keep that potential. Normally, leakage current of the supercapacitorsis higher than the Li-ion batteries. The leakage current of the invention was observed only 50 μA at 200 s and reached 16 μA at 2000 s (FIG. 16a) which was less than the reported values of supercapacitors. The device was able to withstand 0.25V even at 24 hr which was also comparable to the literature values (FIG. 16b).

TABLE 1

| In this Work | Solid Electrolyte | Specific Capacitance (F/g) | Areal Capacitance (mF/cm$^2$) | Internal Resistance (Ω) | Leakage current (μA) | Energy Density Wh/Kg | Voltage window | Ref |
|---|---|---|---|---|---|---|---|---|
| In this work | PVA-H$_2$SO$_4$ | 638 | 957 | 1 | 15 | 14.36 | 0.8 | |
| Carbon nanoparticles/ MnO$_2$ | PVA-H$_3$PO$_4$ | 675 | 20 | 4 | 15 | 4.8 | 0.8 | ACS Nano 2012, 6, 656-661 |
| Hierarchical GeSe$_2$ | PVA-H$_2$SO$_4$ | — | 0.25 | 30 | 0.02 | | 0.6 | Nano Letters 2009, 9, 1872-1876 |
| N,B doped 3D | PVA-H$_2$SO$_4$ | 62 | — | — | — | 8.7 | 1 | Adv. Mater. 2012, 24, |

TABLE 1-continued

| In this Work | Solid Electrolyte | Specific Capacitance (F/g) | Areal Capacitance (mF/cm$^2$) | Internal Resistance ($\Omega$) | Leakage current ($\mu$A) | Energy Density Wh/Kg | Voltage window | Ref |
|---|---|---|---|---|---|---|---|---|
| graphene SWCNT | PVA-H$_3$PO$_4$ | 35 | 1000 | 60 | — | 6 | 1 | 5130-5135 *Nano Lett.*, 2009, 9 (5), pp 1872-1876 |
| CNT-PANI | PVA-H$_2$SO$_4$ | 350 | 800 | 11 | 17 | 7.1 | 0.8 | *Nano Letters* 2010, 10, 4025-4031 |
| Nano Porous Gold-PPy | PVA-HClO$_4$ | 250 | 1.8 | — | | 6.7 | 0.8 | *Adv. Mater.* 2011, 23, 4098-4102 |
| PANI/Au paper | PVA-H$_3$PO$_4$ | — | 50 | 25 | 10 | | 0.8 | *Angew. Chem. Int. Ed.* 2012, 51, 4934-4938 |

TABLE 2

Electrochemical Characteristics of deposition of PVA (component B)on to the porous carbon paper (component A)

| Loading of B | Specific capacitance | Aerial capacitance | Internal resistance | Capacitance per total weight of the device | Energy Density |
|---|---|---|---|---|---|
| 0.3-5 mg/cm$^2$ | 850-400 (refer FIG. 7(I)) | 255-2000 mF/cm2 | 1 $\Omega$/cm$^2$ (FIG. 12a) | 12 F/g | 14 Wh/Kg |

TABLE 3

| Sample | Loading of PEDOT (mg) | Weight of Carbon paper (mg) | Total weight of device (mg, ±5%) | Capacitance obtained mF | Capacitance of the device (F g$^{-1}$, ±5%) |
|---|---|---|---|---|---|
| CP-50 | 0.63 | 13 | 45 | 28.5 | 0.6 |
| CP-100 | 2.52 | 13 | 46 | 48.2 | 1.0 |
| CP-300 | 3.78 | 13 | 47 | 127.6 | 2.7 |
| CP-600 | 7.56 | 13 | 51 | 249.5 | 4.9 |
| CP-1200 | 15.12 | 13 | 59 | 419.6 | 7.1 |

We claim:

1. An all solid state super capacitor with an enhanced electrode-electrolyte interface comprising:
   a first electrode structure;
   a second electrode structure compressed against the first electrode structure;
   wherein each of the first and the second electrode structures comprises a three-dimensional collector structure defining a plurality of pores and having a first surface and a second surface;
   wherein an electrically conducting polymeric material is coated on the first surface of the three dimensional collector structure that also occupies at least a part of the pores and an electrolyte material coated on the second surface of the three dimensional collector structure that also occupies at least a part of the remaining pores such that one or more pores accommodate intercalation of the electrically conducting polymeric material with the electrolyte material in solid form; and
   wherein a layer of the electrolyte material serves as a separator between the first and the second electrode structures;
   wherein the weight of each of the three-dimensional collector structure is in the range of 12.5-13.5 mg/cm$^2$.

2. The all solid state super capacitor according to claim 1, wherein the three dimensional collector structure is selected from carbon paper, carbon cloth, nickel foam and 3D-graphene.

3. The all solid super capacitor according to claim 1, wherein the electrically conducting polymeric material is selected from polyaniline (PAM) and polyethylene dioxythiophene (PEOT).

4. The all solid state super capacitor according to claim 3, wherein the polyaniline is in the range of 0.3-5 mg/cm$^2$.

5. The all solid state super capacitor according to claim 3, wherein the Polyethylene dioxythiophene (PEOT) is in the range of 0.6-16 mg/cm$^2$.

6. The all solid state super capacitor according to claim 1, wherein the electrolyte material is an aqueous solution of PVA-H$_2$SO$_4$.

7. The all solid state super capacitor according to claim 6, wherein the aqueous solution of PVA-H$_2$SO$_4$ comprises 48 wt. % H$_2$SO$_4$, 48 wt. % PVA, and 4 wt. % water.

8. A method of fabricating an all solid state super capacitor with enhanced electrode-electrolyte interface, the method comprising the steps of:

i. providing two three-dimensional collector structures, each defining a plurality of pores;
ii. coating or loading an electrically conducting polymeric material on to the two three-dimensional collector structures of step (i);
iii. coating or loading an electrolyte material onto the two three-dimensional collector structures of step (ii) such that one or more pores accommodate an intercalation of the electrically conducting polymeric material with the electrolyte material in solid form; and
iv. compressing the two three-dimensional collector structures of step (iii) coated or loaded with electrically conducting polymeric material and electrolyte material together to obtain all-solid-state-super capacitor such that a layer of the electrolyte material serves as a separator between the two three-dimensional collector structures;
wherein the weight of each of the three-dimensional collector structure is in the range of 12.5-13.5 mg/cm$^2$.

9. The method as claimed in claim 8, wherein the electrically conducting polymeric material is selected from polyaniline (PANT) or Polyethylene dioxythiophene (PEOT).

10. The method as claimed in claim 8, wherein the electrically conducting polymeric material is polyaniline (PANT), which is roll coated using K-coater on to the two three-dimensional collector structures of step (i).

11. The method as claimed in claim 10, wherein the polyaniline is in the range of 0.3-5 mg/cm$^2$.

12. The method as claimed in claim 8, wherein the electrically conducting polymeric material is Polyethylene dioxythiophene (PEOT), which is electrodeposited on to the two three-dimensional collector structures of step (i).

13. The method as claimed in claim 12, wherein the Polyethylene dioxythiophene (PEOT), is in the range of 0.3-8 mg/cm$^2$.

14. The method as claimed in claim 8, wherein the electrolyte material is an aqueous solution of PVA-H$_2$SO$_4$.

15. The method as claimed in claim 14, wherein the aqueous solution of H$_2$SO$_4$-PVA comprises 48 wt. % H$_2$SO$_4$, 48 wt. % PVA, and 4 wt. % water.

16. The method as claimed in claim 8, wherein each of the two three dimensional collector structure is selected from carbon paper, carbon cloth, nickel foam and 3D-graphene.

* * * * *